United States Patent
Ekström et al.

(10) Patent No.: US 7,691,489 B2
(45) Date of Patent: Apr. 6, 2010

(54) HIGH STRENGTH LONG-LIFE ALUMINIUM TUBE MATERIAL WITH HIGH SAGGING RESISTANCE

(75) Inventors: Hans-Erik Ekström, Finspång (SE);
Stefan Wass, Norrköping (SE); Richard Westergård, Finspång (SE); Anders Oscarsson, Finspång (SE); Annika Moberg, Linköping (SE)

(73) Assignee: Sapa Heat Transfer AB, Finspång (SE)

( * ) Notice: Subject to any disclaimer, the term of this patent is extended or adjusted under 35 U.S.C. 154(b) by 228 days.

(21) Appl. No.: 11/083,321

(22) Filed: Mar. 18, 2005

(65) Prior Publication Data
US 2005/0221111 A1    Oct. 6, 2005

Related U.S. Application Data

(60) Provisional application No. 60/568,241, filed on May 6, 2004.

(30) Foreign Application Priority Data
Mar. 22, 2004    (SE) .................................... 0400724

(51) Int. Cl.
B32B 15/20    (2006.01)
C22C 1/00    (2006.01)

(52) U.S. Cl. ...................... 428/654; 420/535; 420/544; 420/553; 165/905; 228/262.51

(58) Field of Classification Search ........................ None
See application file for complete search history.

(56) References Cited

U.S. PATENT DOCUMENTS

| 4,203,490 | A | * | 5/1980 | Terai et al. ................ 165/134.1 |
| 4,244,756 | A | * | 1/1981 | Tanabe et al. ................ 428/544 |
| 4,317,484 | A | * | 3/1982 | Tanabe et al. ............. 165/134.1 |
| 4,632,885 | A | * | 12/1986 | Tanabe et al. ................ 428/654 |
| 4,816,087 | A | * | 3/1989 | Cho ........................... 148/692 |
| 4,967,679 | A | | 11/1990 | Hara et al. |
| 6,019,939 | A | | 2/2000 | Gray et al. |
| 6,387,540 | B1 | * | 5/2002 | Yoshidomi et al. .......... 428/654 |
| 6,465,113 | B2 | | 10/2002 | Yamada et al. |
| 6,756,133 | B2 | | 6/2004 | Palmer et al. |
| 7,255,932 | B1 | * | 8/2007 | Kilmer ....................... 428/654 |
| 2005/0106410 | A1 | * | 5/2005 | Jiang et al. .................. 428/654 |

FOREIGN PATENT DOCUMENTS

| EP | 0 867 682 A2 | * | 9/1998 |
| JP | 63-195239 | * | 8/1988 |
| JP | 63-206444 | * | 8/1988 |
| JP | 8246117 A | | 9/1996 |
| WO | WO 02007189 A2 | | 9/2002 |
| WO | WO 03/089237 A1 | | 10/2003 |

OTHER PUBLICATIONS

Examination Report issued by the Mexican Patent Office on Sep. 11, 2009 (along with an English translation) in counterpart Mexican Application No. PA/a/2005/002857.

* cited by examiner

*Primary Examiner*—John J Zimmerman
(74) *Attorney, Agent, or Firm*—Venable LLP; Eric J. Franklin

(57) ABSTRACT

An aluminum alloy, a clad or unclad material for a brazed product containing the alloy as a core, and a method for producing the material, wherein the material is used for manufacturing the brazed product from the alloy.

6 Claims, 2 Drawing Sheets

(Prior Art)

HIGH STRENGTH LONG-LIFE ALUMINIUM TUBE MATERIAL WITH HIGH SAGGING RESISTANCE

CROSS-REFERENCE TO RELATED APPLICATIONS

This application claims priority to U.S. provisional patent application 60/568,241 filed 6 May 2004 and to Swedish patent application 0400724-1 filed 22 Mar. 2004.

FIELD OF THE INVENTION

The invention pertains in general to the field of an aluminium alloy, a clad or unclad material for a brazed product containing said alloy as a core. The invention also relates to a method for producing said material, wherein the material is used for manufacturing said brazed product from said alloy.

BACKGROUND OF THE INVENTION

Presently, tube materials commonly used by manufacturers of heat exchangers are standard AA3003, or so-called long-life 3005 alloy. These are also the most commonly used materials in manufacturing processes, including Controlled Atmosphere Brazing method (CAB). The long-life 3005 alloy is a standard alloy AA3005, produced with a special process to increase the corrosion resistance of the material, which may be used in heat exchangers etc.

However, the mechanical strength of such materials does not meet the present requirements of the heat exchanger manufacturers, since heat exchanger manufacturers of today desire to produce heat exchangers comprising thinner tubes, which results in heat exchangers with lighter weight.

In the manufacturing of said tube materials, a much overlooked, but increasingly important, property is the ability of the material to resist sagging. Sagging is the ability of the material to resist deformation at brazing temperatures, imposed by the weight of the formed sheet material during the brazing process. Typically, sagging increases as the thickness of the manufactured material decreases. At the same time thinner thickness of the manufactured material requires improved resistance against corrosion attack, which corrosion attack may cause perforation of the manufactured material.

U.S. Pat. No. 6,019,939 discloses an aluminium brazing sheet, comprising 0.7 to 1.5 weight % Mn, 0.5 to 1.0 weight % Cu, less than 0.15 weight % Si, less than 0.8 weight % Mg, and optionally V, Cr or Ti and unavoidable impurities. According to U.S. Pat. No. 6,019,939 the preferred amount of Mn is 0.8 to 1.2 weight % and all examples discloses a maximum of 1 weight % Mn. This content of Mn will not produce the desired sagging resistance. Furthermore, it will also not give the maximum strength or corrosion protection that can be obtained by using a higher amount of Mn. The teachings of this patent also points away from using Zr as an additive.

JP 8246117 discloses an aluminium alloy of a high strength, used in brazing sheets for heat exchangers. The preferred Si content of this alloy is 0.3 to 0.7 weight %. This amount of Si is too high to provide the required corrosion resistance of the brazing sheet.

U.S. Pat. No. 6,465,113 discloses an aluminium alloy brazing sheet for vehicles, comprising a four layered structure consisting of an aluminium alloy core, a filler alloy on one side of the core, a sacrificial anode material on the other side and an intermediate layer between the core and the sacrificial anode material, said intermediate layer being composed on an aluminium alloy having 0.1 to 0.5 weight % Si, 0.2 to 0.8 weight % Fe, 0.5 to 2.0 weight % Mn, and 0.4 to 1.0 weight % Cu, and optionally containing up to 0.3 weight % Zr. The balance is aluminium and unavoidable impurities. The composition is used as a thin intermediate layer and will therefore not, and is not intended to, provide a required strength to the obtained product. The silicon content in the alloy is also too high to give a desirable corrosion resistance.

WO02070189 discloses an aluminium brazing sheet, particularly suitable for charge air cooler applications, wherein the core comprises <0.2 weight % Si, 1.3-1.7 weight % Mn, 0.4-0.8 weight % Mg, 0.3-0.7 weight % Cu, <0.2 weight % Ti and 0.05-0.2 weight % Zr. This alloy is used for vacuum brazed heat exchangers and receives its strength through the high content of Mg. However, since the content of Mg is high, CAB-brazing of these alloys is very difficult due to a reaction between Mg and the flux.

Thus, there is a need for a new aluminium alloy with an improved ability to withstand corrosion and sagging, while having a high strength, when used to manufacture brazed products from said alloy.

SUMMARY OF THE INVENTION

The present invention relates to an improved aluminium alloy, having improved properties in connection to corrosion, and sagging, while still having a high strength, when used to manufacture brazed products from said alloy.

The present invention mitigate, alleviate and/or eliminate the above mentioned deficiencies by providing an aluminium alloy, and a method for producing said aluminium alloy.

According to one aspect of the invention, an aluminium alloy is provided and a method for producing said aluminium alloy, which aluminium alloy has a combination of elements that present an increased corrosion resistance, increased sagging resistance, and high strength. Said aluminium alloy comprises below 0.1 weight % Si, below 0.4 weight % Mg, 1.55 to 1.90 weight % Mn, 0.6 to 1.0 weight % Cu, and 0.05 to 0.25 weight % Zr.

According to yet another aspect of the invention, there is provided a manufacturing process of a brazed material from said aluminium alloy, said aluminium alloy having a combination of elements that present an increased corrosion resistance, increased sagging resistance, and high strength. The process comprises subjecting said alloy to a casting process, and thereafter subjecting the thus obtained material to a hot rolling process and/or a cold rolling process.

Accordingly, the invention relates to the use of the above mentioned aluminium alloy, the method for producing said aluminium alloy as well as products produced from said aluminium alloy.

The present invention has at least the advantage over the prior art in that it simultaneously provides improved ability to withstand corrosion and sagging, while still having a high strength.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Figure 1:
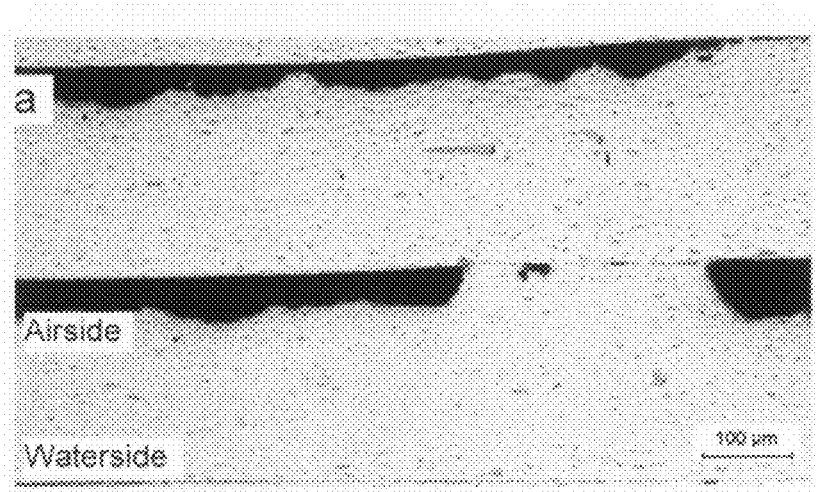
FIG. 1(a) is a cross-section of the aluminium alloy (B) according to the invention after 30 days exposure to SWAAT.
FIG. 1(b) is a cross-section of the aluminium alloy (A) according to the prior art after 30 days exposure to SWAAT.
FIG. 1(c) is a cross-section of an alloy according to the prior art after 30 days exposure to SWAAT.
Figure 1:
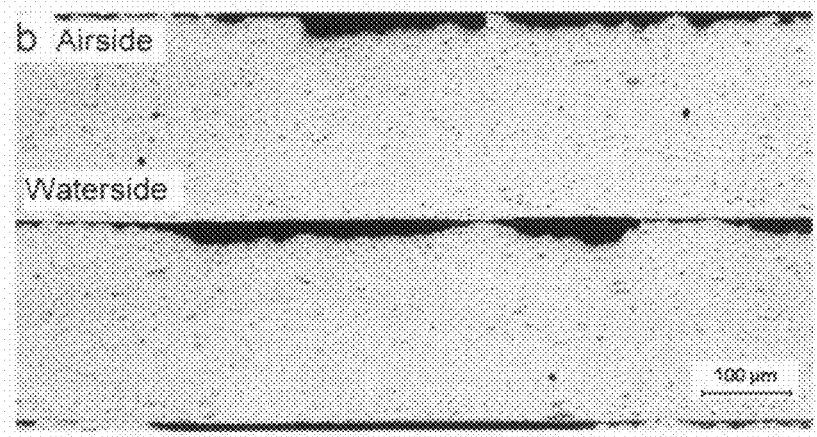
Figure 1:
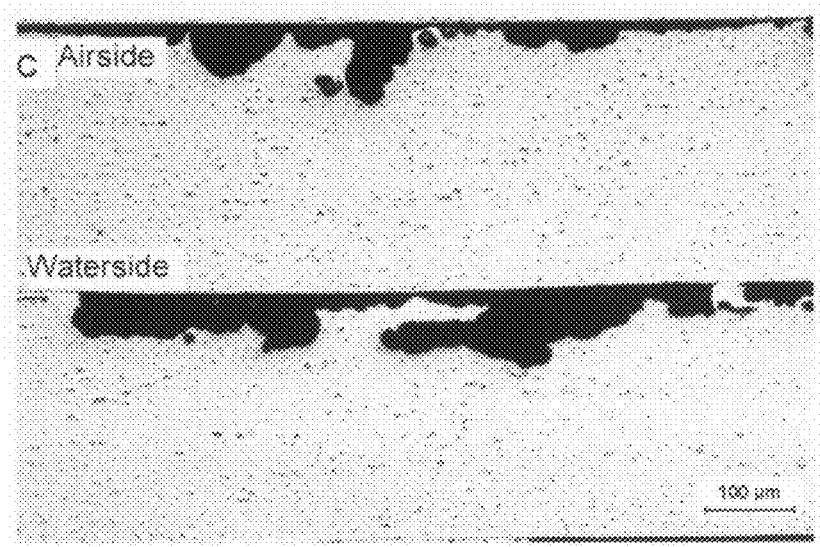

The following description focuses on embodiments of the present invention applicable to an aluminium alloy, a clad or unclad material for a brazed product containing said alloy as a core, and in particular to a method for producing said material, which material is used when manufacturing said brazed product from said alloy. However, it will be appreciated that the invention is not limited to this application but may be applied to many other technical fields, including for example tubes for heat exchangers, like automotive radiators or heaters; tube plates for oil coolers; evaporators.

In one embodiment of the present invention the corrosion resistance of the aluminium alloy according to the invention is improved, by regulating the content of silicon (Si) to be 0.1 weight % or less than 0.1 weight %, such 0.09, 0.08, 0.07, 0.06, 0.05, 0.04, 0.03, 0.02 or 0.01 weight %. This causes any corrosion attack to proceed in the lateral direction, whereby pitting corrosion is avoided and the corrosion attack becomes lamellar. When the concentration of Si exceeds about 0.1 weight % this effect is substantially lost, and the formation of a sacrificial layer is hindered.

To provide the aluminium alloy according to the present invention with an increased strength, the content of magnesium (Mg) is controlled, since Mg increases the strength, when in solid solution or by forming $Mg_2Si$ precipitates during ageing. However, Mg decreases the brazability by reacting with the flux. The present inventors have unexpectedly found that a concentration, in the aluminium alloy according to the present invention, of Mg in the interval of from about 0.05 to about 0.4 weight %, such as 0.05, 0.1, 0.15, 0.2, 0.25, 0.30, 0.35 or 0.40 weight %, provides a good balance of strength and brazability in respect of the aluminium alloy according to the invention, by functioning in harmony with the content of Si. An Mg concentration below about 0.05 weight % results in that the effect on the strength from solid solution is negligible, and an Mg concentration above about 0.4 weight % impair brazability. A version without Mg is included as this provides the possiblility of using the material for folded tubes, which are difficult to flux internally, which can cause insufficient joint formation inside tube folds.

To further increase the strength of the aluminium alloy according to the present invention, an addition of Cu is performed. Cu is a known strengthening agent in aluminium when in solid solution. It is also expected that Cu may give an advantageous ageing response by heat treatment, or during use, of the brazed product. Furthermore, the strength increasing ageing response by copper (Cu) is increased by the presence of smaller amounts of Mg. However, if the concentration of Cu is too high, adverse effects may arise, such as hot crack sensitivity during casting, decreased corrosion resistance, and lowered solidus temperature. Thus, it has been established by the present inventors that the concentration of Cu in the aluminium alloy according to the present invention preferably is in the interval of from about 0.6 to about 1.0 weight %, such as about 0.7, 0.8, and 0.9 weight %, in respect of said aluminium alloy.

Manganese (Mn) is another element that may increase strength in the aluminium alloy according to the invention. A large amount of Mn gives a large number of small particles upon preheating of the aluminium alloy according to the invention prior to hot rolling. This large number of particles provides an improved resistance to sagging at brazing temperatures. Furthermore, Mn is advantageous in respect of corrosion resistance. Therefore, the content of Mn in the aluminium alloy according to the invention may be in the interval of from about 1.55 to about 1.90 weight %, such as about 1.60, 1.65, 1.70, 1.75, 1.80 or 1.85 weight %.

Zirconium (Zr) also increases the number of particles, which, according to above, is beneficial in the aluminium alloy according to the invention. However, a large amount of Zr increases the risk of coarse precipitates during casting. Therefore, the content of Zr in the aluminium alloy according to the invention may be present in a concentration of 0.25 weight % or below 0.25 weight %, such as about 0.20, 0.15, 0.10 or 0.05 weight %.

Iron (Fe) adversely affects the corrosion resistance, but reduces the hot cracking sensitivity of aluminium alloys containing Cu, and may therefore be present in a concentration below about 0.5 weight %, such as about 0.4, 0.3, 0.2 or 0.1 weight %, in the aluminium alloy according to the present invention.

In another embodiment of the present invention the aluminium alloy, obtainable by the process mentioned above, may be scalped or clad with at least one additional layer, e g a braze clad layer. It is of course within the scope of the present invention to scalp or clad with more than one layer, such as two, three, four or five layers. This embodiment presents the advantage of providing a sacrificial layer. This sacrificial layer further improves the corrosion resistance of the aluminium alloy according to the present invention.

In still another embodiment of the present invention the aluminium alloy is produced by casting. The aluminium alloy may subsequently be subjected to hot rolling and/or cold rolling processes. These processes are since long time well known to the person skilled in the art, and will therefore not be further described in the present description.

In yet another embodiment of the present invention the aluminium alloy may be partially or fully annealed after said hot rolling and/or cold rolling processes. This annealing step may also be omitted in another embodiment of the invention.

When manufacturing an aluminium alloy, according to the present invention, it is impossible to avoid small amounts of impurities. These impurities are not mentioned, nor left out, in the present invention, but will never exceed 0.15 weight % in total. In the embodiments, and the examples, of the present invention the balance consists of aluminium.

Hereinafter the embodiments of the present invention will be described by way of examples.

EXAMPLES

Materials, according to the examples of the present invention, were made by direct chill casting followed by scalping and cladding with a braze cladding of the AA4343-type. In the following examples the braze claddings constituted 10% of the total sheet thickness. It is of course within the scope of the present invention to vary the thickness of said braze claddings to fit different forms of application. Furthermore, it is within the scope of the present invention to scalp or clad with any braze cladding, intended to cover all aluminium braze alloys of the 4XXX-series. Thus, the thickness of the braze claddings, and the type of the braze cladding, in these examples are only intended to be interpreted as an example.

Alloys referring to the present invention were additionally clad with a waterside cladding, with composition according to Table 1. The waterside cladding constituted 10% of the total sheet thickness. Subsequent processing included heating, hot rolling and cold rolling. A final heat treatment to the H24 temper was made for each alloy.

TABLE 1

The composition of the waterside cladding used on the alloys according to the present invention.

| | Alloying element | | | | | |
|---|---|---|---|---|---|---|
| | Si | Fe | Cu | Mn | Mg | Zr | Zn |
| Content [weight %] | 0.87 | 0.26 | 0.03 | 1.69 | 0.01 | 0.14 | 1.55 |

Example 1

Sagging Distance

Four alloys were designed, using the composition of the high Mn material of U.S. Pat. No. 6,019,939 as ref I. One alloy was made to have the same composition as the reference but with higher Cu (ref II). The alloys referring to the present invention were made in two variants, without Mg (A) and with Mg (B). The compositions of the alloys are shown in Table 2.

Test pieces were cut to rectangular size and mounted as cantilever beams, with a free overhang of 80 mm. The position of the free end of the beam was measured before and after braze simulation, and the difference between the positions is hereinafter denoted as sagged distance. A vacuum braze cycle was used with heating from room temperature to 600° C. in 45 minutes, 10 minutes soaking at temperature and free cooling in air from ~550° C.

It is evident from the test results, according to Table 3, that a higher amount of Cu in the alloy does not in itself increase the resistance to sagging, as was stated in U.S. Pat. No. 6,019,939. Seemingly, a presence of Zr is needed to compensate for the increased sagging caused by the increased amount of Cu in the alloy. The alloys referring to the present invention gives about 10% improved resistance to sagging, despite having thinner gauges.

TABLE 2

Chemical composition in wt %, melt analysis

| Specimen | Si | Fe | Cu | Mn | Mg | Zr |
|---|---|---|---|---|---|---|
| Ref I | 0.04 | 0.16 | 0.59 | 1.48 | 0.27 | <0.01 |
| Ref II | 0.04 | 0.16 | 0.79 | 1.46 | 0.28 | <0.01 |
| A | 0.06 | 0.16 | 0.79 | 1.72 | <0.01 | 0.12 |
| B | 0.06 | 0.19 | 0.81 | 1.72 | 0.31 | 0.13 |

TABLE 3

Sagging distances

| | Ref I | Ref II | A | B |
|---|---|---|---|---|
| Gauge [μm] | 303 | 309 | 271 | 271 |
| Sagged distance [mm] | 19.1 | 21.8 | 17.2 | 17.6 |

Example 2

Influence of Mn-Content on Strength

Four alloys were designed using the composition of the high Mn material of U.S. Pat. No. 6,019,939 as a reference. One alloy was made to have the same composition as the reference, but with high Zr (ref. III). The alloys referring to the present invention were made in two variants, without Mg (A) and with Mg (B). The compositions of the alloys are shown in Table 4. Samples were taken when the material was in a thickness suitable for tubes and in H24 temper.

The materials were braze simulated in vacuum, and cut to suitable lengths for tensile testing. The vacuum braze cycle included heating from room temperature to 600° C. in 45 minutes, 5 minutes soaking at said temperature, and free cooling in air from ~550° C. Only air cooled samples (~1° C./s) were used.

The results of the tensile tests are shown in Table 5. Increasing the Mn from 1.5 to 1.7 weight % increased the strength. The strength increase due to increased Mn-content is about 6%.

TABLE 4

Chemical composition in weight %, melt analysis.

| Specimen | Si | Fe | Cu | Mn | Mg | Zr |
|---|---|---|---|---|---|---|
| Ref I | 0.04 | 0.16 | 0.59 | 1.48 | 0.27 | <0.01 |
| Ref III | 0.04 | 0.16 | 0.57 | 1.46 | 0.26 | 0.12 |
| A | 0.06 | 0.16 | 0.79 | 1.72 | <0.01 | 0.12 |
| B | 0.06 | 0.19 | 0.81 | 1.72 | 0.31 | 0.13 |

TABLE 5

Post-braze strengths.

| | $R_{p0.2}$ [Mpa] | $R_m$ [Mpa] | $A_{50\,mm}$ [%] |
|---|---|---|---|
| Reference I | 60.5 | 167 | 13 |
| Reference III | 60.6 | 163.5 | 11.5 |
| A | 57.1 | 161 | 14.6 |
| B | 64.3 | 180.5 | 14.8 |

Example 3

Influence of Mg-Content on Yield Strength

Two alloy compositions according to the invention without Mg (A) and with Mg (B) was compared, according to Table 6. Sheets of the materials were braze simulated in a vacuum furnace at a pressure of about $10^{-4}$ torr according to the following standard brazing cycle: heating from room temperature to 600° C. in 45 minutes followed by a 5 minute soaking at temperature before samples were cooled down to room temperature in air.

It was shown that Mg was beneficial to the strength, and increased the yield strength by 7 MPa, according to Table 7.

TABLE 6

Chemical composition in wt %, melt analysis.

| Specimen | Si | Fe | Cu | Mn | Mg | Zr |
|---|---|---|---|---|---|---|
| A | 0.06 | 0.16 | 0.79 | 1.72 | <0.01 | 0.12 |
| B | 0.06 | 0.16 | 0.81 | 1.72 | 0.31 | 0.13 |

TABLE 7

Tensile strength after braze simulation.

|   | $R_{p0.2}$ [Mpa] | $R_m$ [Mpa] | $A_{50\,mm}$ [%] |
|---|---|---|---|
| A | 57.1 | 161 | 14.6 |
| B | 64.3 | 180.5 | 14.8 |

Example 4

The Influence of Zr on Strength

Three alloys were designed using the composition of the high Mn material of U.S. Pat. No. 6,019,939 as a reference. One alloy, Ref III, was made to have the same composition as the ref I but with high Zr, according to Table 8. One alloy, B in Table 8, according to the present invention with the similar high amount of Mg was made. The chemical compositions are seen in Table 8.

The materials were braze simulated in vacuum and cut to suitable lengths for tensile testing. The vacuum braze cycle was heating from room temperature to 600° C. in 45 minutes, 5 minutes soaking at said temperature and free cooling in air from ~550° C. Only air cooled samples (~1° C./s) were used.

The tensile tests results are shown in Table 9. Increasing the Zr does not influence the strength for these alloys.

TABLE 8

Chemical composition in wt %, melt analysis.

| Specimen | Gauge | Si | Fe | Cu | Mn | Mg | Zr |
|---|---|---|---|---|---|---|---|
| Ref I | 308 | 0.04 | 0.16 | 0.59 | 1.48 | 0.27 | <0.01 |
| Ref III | 310 | 0.04 | 0.16 | 0.57 | 1.46 | 0.26 | 0.12 |
| B | 275 | 0.06 | 0.19 | 0.81 | 1.72 | 0.31 | 0.13 |

TABLE 9

Tensile test data.

|   | $R_{p0.2}$ [Mpa] | $R_m$ [Mpa] | $A_{50\,mm}$ [%] |
|---|---|---|---|
| Reference I | 60.5 | 167 | 13 |
| Ref III | 60.6 | 163.5 | 11.5 |
| B | 64.3 | 180.5 | 14.8 |

Example 5

SWAAT Corrosion Testing

The corrosion behaviour was evaluated by using the Sea Water Acetic Acid Test (SWAAT). SWAAT is an accelerated cyclic corrosion test, in accordance with ASTM G 85, without any heavy metals. A CAB batch furnace was used to braze the materials, with a thermal cycle going from room temperature to 600° C. in 15 minutes, 3 minutes soaking at temperature, cooling at about 0.5° C./s to ~350° C. and finally cooling in air. The substitute ocean water was made up according to ASTM D 1141, but without pH adjustment to pH 8.2. A pH adjustment, with NaOH, was instead made after the addition of 10 ml/l acetic acid, to adjust the final of the SWAAT solution to pH 2.8 to 3.0. During testing, the SWAAT solution was intermittently sprayed into a cabinet, an Ascott CC1000t test cabinet, for 30 minutes, following a non-spray time of 90 minutes. The samples were placed horizontally at the cabinet top, and at a 15 degrees angle to the vertical. All samples measured 6×11 cm, and were obtained from braze simulated A4 size sheet, which were degreased ultrasonically for 5 minutes in Candoclene, at 50° C., rinsed first in de-ionised water and then in ethanol before drying. The samples were covered on the opposite filler side with a plastic adhesive, to provide protection from the corrosive salt spray. Samples of Samples of the commercially available 3005LL and AA3003 were included as reference materials in the testing of the aluminium alloys according to the present invention, B and C in Table 10.

The chemical compositions of the aluminium alloys according to the present invention, and the reference materials, are specified in table 10.

TABLE 10 chemical compositions in weight % in SWAAT (For 3005LL and AA3003 the maximum values are given, unless expressed as a range).

|   | Si | Fe | Cu | Mn | Mg | Zr |
|---|---|---|---|---|---|---|
| A | 0.06 | 0.16 | 0.79 | 1.72 | <0.01 | 0.12 |
| B | 0.06 | 0.19 | 0.81 | 1.72 | 0.31 | 0.13 |
| 3005LL | 0.6 | 0.7 | 0.2–0.4 | 1.0–1.5 | 0.10–0.40 | — |
| AA3003 | 0.6 | 0.7 | 0.05–0.2 | 1.0–1.5 | — | — |

Three samples of each material were retrieved from the cabinet after 20, 30, and 40 days of SWAAT exposure. Evaluation after SWAAT testing included cleaning of the samples in nitric acid (65%) for 15 minutes, to remove corrosion products for a visual inspection for perforations. Sections were made to study the mode of corrosion attack, and to determine the depth of the corrosion attack, by using Light Optical Microscope (LOM).

The samples of the aluminium alloys according to the present invention showed no signs of perforation after being withdrawn from the SWAAT testing after 20, 30, and 40 days, according to Table 11. However, the commercially available reference 3005LL alloy showed some perforations after 30 days SWAAT testing, thus the time to first perforation for the commercially available 3005LL was 21–30 days, see Table 11. AA3003 showed severe perforations already after 10 days.

Table 11 Time to first perforation in SWAAT Alloy Days to first perforation

TABLE 11

Time to first perforation in SWAAT

| Alloy | Days to first perforation |
|---|---|
| A | >40 |
| B | >40 |
| 3005LL | 21–30 |
| AA3003 | 3–10 |

Furthermore, cross-sections of the reference sample and the samples of the aluminium alloy according to the present invention were also analysed, according to FIGS. 1 (a)-(c). On the samples of the aluminium alloy, according to the invention, only lateral corrosion attack in the surface layer could be observed, according to FIGS. 1(a) and (b). This is evidence for the existence of a sacrificial surface layer in the aluminium alloy according to the invention.

3005LL showed perforations in the material, and a corrosion morphology where pitting is about to take place according to FIG. 1(c).

Example 6

Corrosion Potential

The electrochemical corrosion potential of the aluminium alloy according to the present invention was measured and compared to reference sample, in form of commercially pure aluminium, AA3003, and commercially available 3005LL. A CAB batch furnace was used to braze the materials, with a thermal cycle going from room temperature to 600° C. in 15 minutes, 3 minutes soaking at temperature, cooling at about 0.5° C./s to ~350° C. and finally cooling in air. The electrochemical corrosion potential was measured as a function of depth, from the braze metal surface to the core. The waterside was covered with an adhesive, prior to an incremental etching procedure in hot caustic, to remove layers from the braze metal surface in successive steps. For each etching step, etching times of 1 to 3 minutes were applied, depending on the amount of material to be removed. After each etching period, a sample, 1.5 cm wide, was cut out. Eight etching steps were performed, thus producing eight samples of each material, with various thicknesses. The maximum etch depth was about 0.15 mm, which corresponds to about half, or more, of the thickness of the brazing sheet.

The corrosion potentials of the full set of eight variously etched samples were measured simultaneously in the SWAAT solution. Prior to recording the potentials, 10 ml/l of hydrogen peroxide was also added. The corrosion potentials were determined from the values obtained in the potential-time curve of each sample after 30 minutes to 1 hour of testing. Finally, the corrosion potentials were plotted against the etched depth, forming a corrosion potential depth profile, according to FIG. 2.

Figure 2:
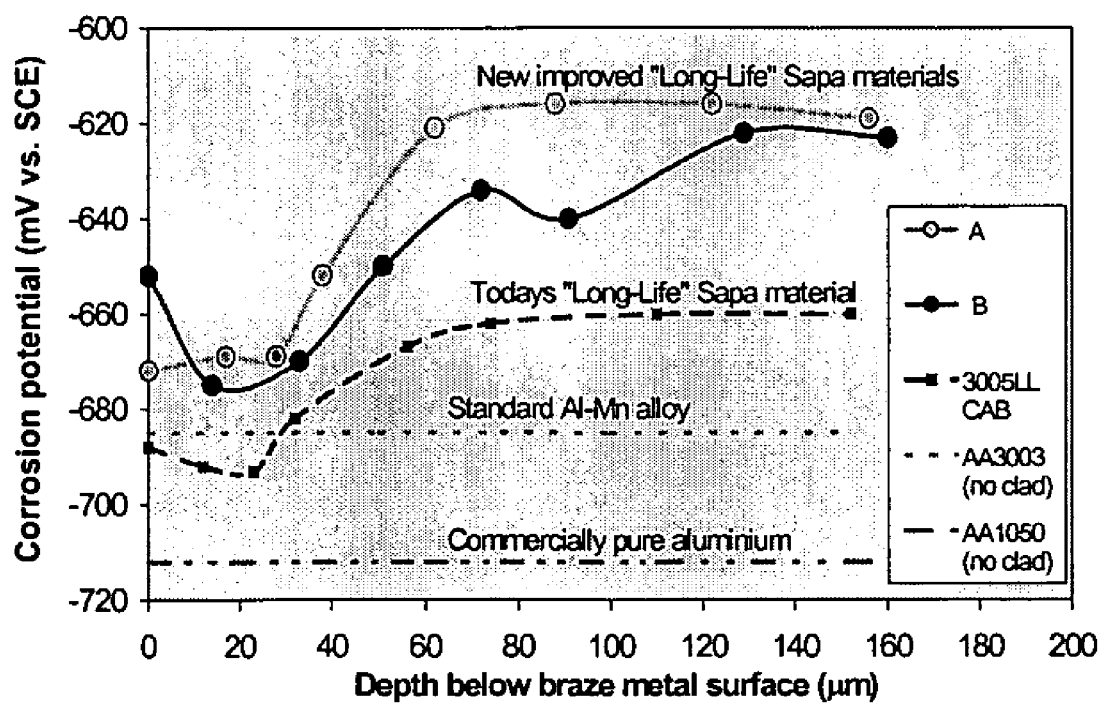
FIG. 2 is a diagram of a corrosion potential for the aluminium alloy according to the invention and for references.

The result from the test in respect of corrosion potential showed that the aluminium alloy according to the present invention has a superior corrosion potential in comparison with the reference samples, which is visualised in FIG. 2. Furthermore, the test in respect of corrosion potential suggest that the aluminium alloy according to the invention has an improved sacrificial effect in comparison with the reference samples.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. An aluminum alloy, consisting of:
    less than 0.1 weight % Si,
    0.05, 0.10, 0.15, 0.2, 0.25, 0.30, or 0.35 weight % Mg,
    1.70, 1.75, 1.80, 1.85, or 1.90 weight % Mn,
    from 0.7 to 0.9 weight % Cu,
    from 0.05 to 0.25 weight % Zr, and
    the balance consisting of aluminum and unavoidable impurities.

2. An aluminum sheet made of the alloy according to claim 1.

3. A clad material for brazed products, comprising:
    a core comprising an alloy consisting of less than 0.1 weight % Si, 0.05, 0.10, 0.15, 0.2, 0.25, 0.30, or 0.35 weight % Mg, 1.70, 1.75, 1.80, 1.85, or 1.90 weight % Mn, 0.7 to 0.9 weight % Cu, 0.05-0.25 weight % Zr, and the balance consisting of aluminum and unavoidable impurities; and
    at least one additional layer.

4. The clad material according to claim 3, wherein at least one of the at least one additional layer comprises an additional aluminum alloy having a melting point that is lower than a melting point of alloy in the core.

5. The aluminum sheet according to claim 1, wherein said sheet is made from a cast aluminum alloy being hot rolled and cold rolled.

6. An aluminum alloy for controlled atmosphere brazing, consisting of:
    less than 0.1 weight % Si,
    0.05, 0.10, 0.15, 0.2, 0.25, 0.30, or 0.35 weight % Mg,
    1.70, 1.75, 1.80, 1.85, or 1.90 weight % Mn,
    from 0.7 to 0.9 weight % Cu,
    from 0.05 to 0.25 weight % Zr, and
    the balance consisting of aluminum and unavoidable impurities.

* * * * *